2,946,701

Patented July 26, 1960

2,946,701

METHOD OF TREATING GLASS WITH EPOXY-SILANES AND THEIR EPOXY-AMINE ADDUCTS, AND THE ARTICLES MADE THEREBY

Edwin P. Plueddemann, Midland, Mich., assignor to Dow Corning Corporation, Midland, Mich., a corporation of Michigan No Drawing. Filed Nov. 12, 1957, Ser. No. 695,542

6 Claims. (Cl. 117—72)

This application relates to the finishing of glass with novel epoxy organosilicon compounds and their derivatives.

At the present time various organosilicon compounds are applied to glass, particularly glass fibers, for the purpose of increasing the adhesion of organic laminating resins to the glass. This gives laminates of superior strength particularly under moist conditions. The most commonly applied finish at the present time is a vinylsilane or a vinylsiloxane. This finish greatly improves the wet strength of polyester laminates. However, the use of vinyl organosilicon compounds is of little or no value in connection with phenolic and epoxy resins.

It is the object of this invention to provide a method of finishing glass fibers which will render them suitable for laminating with all of the commonly employed organic laminating resins. Another object is to provide organic resin glass fiber laminates of improved strength. Another object is to increase the moisture resistance of organic resin glass compositions. Other objects and advantages will be apparent from the following description.

In accordance with this invention glass is finished by applying thereto an aqueous solution of a compound of the group epoxy compounds of the formulas

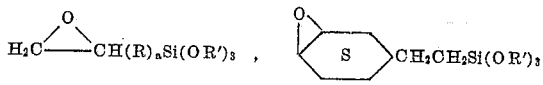

and their epoxy-amine adducts of the formulas

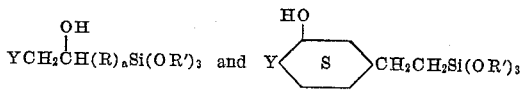

in which Y is a residue of an aliphatic water-miscible amine which is attached to the carbon through a carbon-nitrogen linkage, and water soluble hydrolyzates of said epoxy compounds and said epoxy-amine adducts, in all of which compounds R is a divalent hydrocarbon radical of less than 10 carbon atoms, or a divalent radical of less than 10 carbon atoms composed of C, H and O atoms, the last being in the form of ether linkages, $a$ has a value from 0 to 1 inclusive and R' is an aliphatic hydrocarbon radical of less than 5 carbon atoms, an acyl radical of less than 5 carbon atoms or a radical of the formula $(CH_2CH_2O)_nZ$ in which $n$ is an integer of at least 1 and Z is an aliphatic hydrocarbon radical of less than 5 carbon atoms or hydrogen.

All of the above compositions are applied to the glass in the form of an aqueous solution. This may be done in any suitable fashion. The glass may be dipped in the solution or the glass may be sprayed with the solution. The glass so coated with the organosilicon compound is suitable for use with any of the commonly employed laminating resins.

Alternatively, the compositions employed in this invention may be added to aqueous solutions or emulsions of the bonding resins. For example, any of the above compounds can be added to a solution or an emulsion of a phenolic resin and the whole composition then sprayed onto the glass.

The compositions employed in this invention can be any epoxy silane of the above formula in which R is any divalent hydrocarbon radical such as methylene, ethylene, decalene, phenylene, cyclohexylene, cyclopentylene, methylcyclohexylene, 2-ethylbutylene, and allylene, or an ether radical such as $-CH_2CH_2OCH_2CH_2-$, $-(CH_2CH_2O)_2\text{-}CH_2CH_2-$,

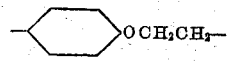

and $-CH_2OCH_2CH_2-$. R' can be any aliphatic hydrocarbon radical of less than 5 carbon atoms such as methyl, ethyl, isopropyl, butyl, vinyl or allyl or any acyl radical of less than 5 carbon atoms such as formyl, acetyl or propionyl, or any radical of the formula $(CH_2CH_2O)_nZ$ in which $n$ is an integer of at least 1, for example, 2, 5 and 8, and Z is hydrogen or any aliphatic hydrocarbon radical of less than 5 carbon atoms such as methyl, ethyl, isopropyl, butyl, vinyl and allyl.

The epoxy compounds of this invention in which R has at least 2 carbon atoms are best prepared by adding unsaturated epoxy compounds to a silane of the formula $HSi(OR')_3$ in the presence of a suitable catalyst such as chloroplatinic acid. This method is fully described in applicant's copending application Serial No. 618,669, filed October 29, 1956, and now abandoned. Those epoxy silicon compounds where R is methylene or where $a$ is 0 are best prepared by oxidizing the corresponding alkenyl silanes such as vinyltriethoxysilane or allyltriethoxysilane with peracetic acid

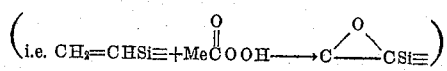

This method is also fully described in the aforesaid copending application.

The epoxy-amine adducts employed in this invention are prepared by reacting the aforesaid epoxy compounds with a water-miscible amine having at least two nitrogen-bonded hydrogen atoms in the molecule. The reaction is best carried out by heating the amine to reflux temperature and then adding the organosilicon epoxy compound dropwise while agitating the reaction mixture. Methods of preparing compositions of this type are more fully described in applicant's copending application Serial No. 684,836, filed September 19, 1957.

The reaction of the amine with the epoxide group to form the epoxy-amine adduct may be represented schematically by the equation

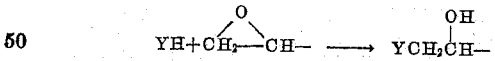

in which Y is attached to the carbon through a nitrogen-carbon bond. Y is the residue from any water miscible aliphatic amine having at least two hydrogen atoms bonded to nitrogen. Specific examples of such amines are alkyl amines such as methyl amine, ethyl amine, isopropyl amine and tertiary-amyl amine; alkenyl amines such as allyl amine and hexenyl amine; and alkylene polyamines such as ethylene diamine, propylene diamine, hexamethylene diamine, diethylene triamine, triethylene pentaamine, and higher polyethylene polyamines of the formula $NH_2(CH_2CH_2NH)_nCH_2CH_2NH_2$ where $n$ is an integer such as 10, 12, 18, etc.

In addition to any of the above silanes the compositions of this invention can be any water soluble hydrolyzate of said silanes. These hydrolyzates can be formed by the partial or complete hydrolysis of the silane OR' groups. Thus, the term "hydrolyzate" includes siloxanes in which some or all of the silicon atoms are bonded through oxygen atoms. The hydrolyzates may or may not contain residual silicon-bonded OR' groups and they may or may not contain silicon-bonded hydroxyl groups, Specific examples of hydrolyzates which are within the scope of this invention are

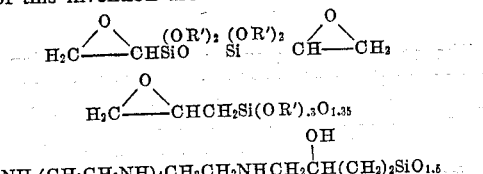

$$NH_2(CH_2CH_2NH)_4CH_2CH_2NHCH_2\overset{OH}{\underset{|}{C}H}(CH_2)_2SiO_{1.5}$$

The treatment of glass in accordance with this invention gives improved products when the glass is bonded with any of the common laminating resins such as polyester resins, phenol aldehyde resins, epoxide resins, melamine formaldehyde resins, silicone resins and urea formaldehyde resins. Not all of the compositions within the scope of this invention are equally effective with all of the laminating resins. However, all of the compositions do give improved results with some of the laminating resins. For example, the epoxy silanes and their water soluble hydrolyzates are particularly effective with all of the commonly employed laminating resins. On the other hand, the epoxy-amine adducts and their water soluble hydrolyzates perform best with the phenol formaldehyde resins and are not particularly advantageous in conjunction with polyester resins.

The beneficial effect of employing the compositions of this invention on glass is shown primarily in the increased strength of the laminates under moist conditions. The use of the compositions of this invention also increases the dimensional stability of glass fibers bonded with organic resins. For example, glass roving or batting which is impregnated with phenolic resins and pressed into wall tile insulation tends to swell under humid conditions. This swelling can be so great that the tiles are actually torn from the wall by pressure of the adjacent tiles. This phenomena is greatly reduced or eliminated by using the compositions of this invention.

The concentration of the aqueous solution is not critical. However, excellent results are obtained employing concentrations of from .2 to 3% by weight of the organosilicon compound although higher or lower concentrations can be employed if desired.

The following examples are illustrative only and should not be construed as limiting the invention which is properly delineated in the appended claims. In the examples and claims the common hydrocarbon radicals are abbreviated by the first two letters of their name such as Me for methyl, Et for ethyl, etc. These abbreviations are in accordance with the official ones employed in Chemical Abstracts.

*Example 1*

The compound

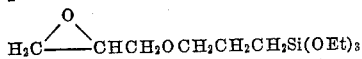

hereinafter referred to as I was prepared by reacting triethoxysilane with allyl glycidyl ether in the presence of chloroplatinic acid at reflux temperature.

I was added slowly to an exess of refluxing ethylene diamine containing .1 g. of phenol as a catalyst, to give the epoxy amine adduct

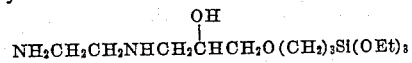

hereinafter referred to as II.

Compound I was dissolved in water acidified by adding acetic acid in amount of 10 drops of acid per liter of solution. The solution was diluted to give a concentration of 1.2% by weight epoxy silane.

Compound II was dissolved in water and diluted to a concentration of .5% by weight.

181 glass cloth was dipped into each solution and dried. The various samples of the coated cloth were impregnated with standard commercial polyester, phenol formaldehyde and epoxy resins. In each case the impregnated cloth was stacked 14 plies deep and laminated under standard conditions. The dry and wet flexural and compressive strengths of each laminate was then determined and are shown in the table below.

| Silicone | Conc. | Flexural strength in p.s.i. | | | | | | Compressive strength in p.s.i. | | | | | |
|---|---|---|---|---|---|---|---|---|---|---|---|---|---|
| | | Polyester | | Phenolic | | Epoxy | | Polyester | | Phenolic | | Epoxy | |
| | | Dry | Wet | Dry | Wet | Dry | Wet | Dry | Wet | Dry | Wet | Dry | Wet |
| I | 1.2 | 58,700 | 64,000 | 76,100 | 68,000 | 67,900 | 57,000 | 31,100 | 30,200 | 55,900 | 43,700 | 43,600 | 37,900 |
| II | .5 | 43,500 | 17,300 | 71,900 | 74,300 | 54,700 | 47,400 | 21,800 | 6,000 | 54,100 | 50,500 | 41,900 | 34,500 |
| Blank | | 51,000 | 15,800 | 66,500 | 44,500 | | | | | | | | |

*Example 2*

Molded articles of improved resistance to moisture are obtained when glass fibers are treated with a 1% by weight aqueous solution of the following silicon compounds and the glass fibers are then bonded with commercial phenol formaldehyde resins:

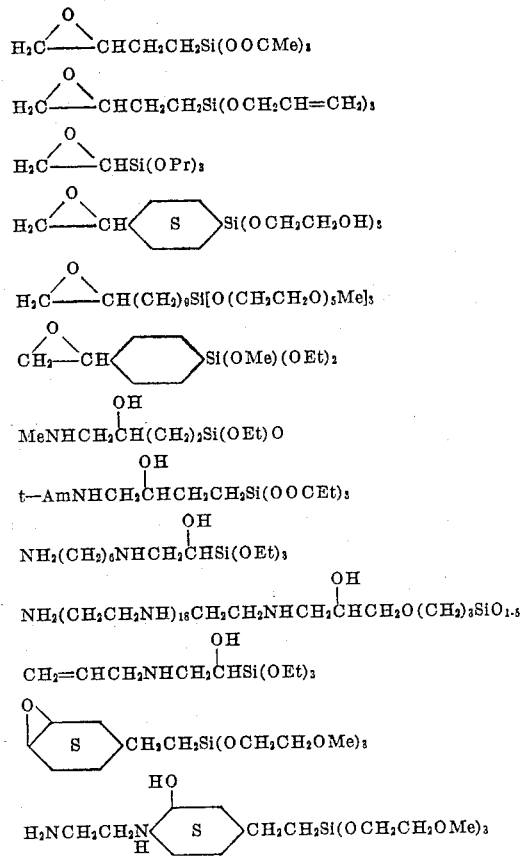

That which is claimed is:

1. A method comprising applying to glass an aqueous solution of a compound selected from the group consisting of epoxy compounds of the formulas

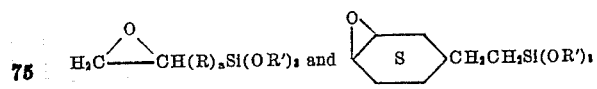

their epoxy-amine adducts of the formulas

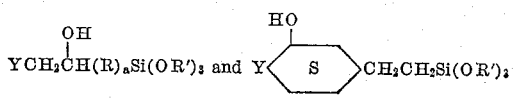

respectively, in which Y is a residue of an aliphatic hydrocarbon radical substituted water-miscible amine which residue is attached to the carbon through a carbon-nitrogen linkage, and water soluble hydrolyzates of said epoxy compounds and said epoxy-amine adducts, in all of which compounds R is a radical attached to silicon by a carbon-to-silicon bond and selected from the group consisting of divalent hydrocarbon radicals of less than 10 carbon atoms and divalent radicals of less than 10 carbon atoms which are composed of carbon, hydrogen, and oxygen atoms, the last being in the form of ether linkages, $a$ has a value selected from the group consisting of 0 and 1 and R' is selected from the group consisting of aliphatic hydrocarbon radicals of less than 5 carbon atoms, carboxyacyl radicals of less than 5 carbon atoms and radicals of the formula $(CH_2CH_2O)_nZ$ in which $n$ is an integer of at least 1 and Z is selected from the group consisting of hydrogen atoms and aliphatic hydrocarbon radicals of less than 5 carbon atoms and allowing the resulting coating to dry.

2. A method of treating glass which comprises applying thereto an aqueous solution of the compound

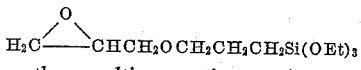

and allowing the resulting coating to dry.

3. A method of treating glass which comprises applying thereto an aqueous solution of a compound of the formula

and allowing the resulting coating to dry.

4. An article of manufacture comprising glass fibers coated with a compound selected from the group consisting of epoxy compounds of the formulas

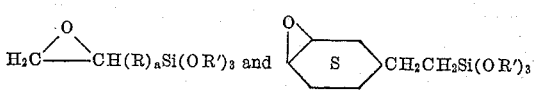

their epoxy-amine adducts of the formulas

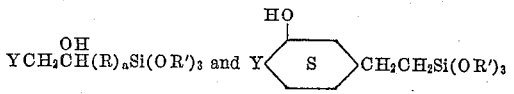

respectively in which Y is a residue of an aliphatic hydrocarbon radical substituted water-miscible amine which residue is attached to the carbon through a carbon-nitrogen linkage, and water soluble hydrolyzates of said epoxy compounds and said epoxy-amine adducts, in all of which compounds R is a radical attached to silicon by a carbon-to-silicon bond and selected from the group consisting of divalent hydrocarbon radicals of less than 10 carbon atoms and divalent radicals of less than 10 carbon atoms which are composed of carbon, hydrogen, and oxygen atoms, the last being in the form of ether linkages, $a$ has a value selected from the group consisting of 0 and 1 and R' is selected from the group consisting of aliphatic hydrocarbon radicals of less than 5 carbon atoms, carboxyacyl radicals of less than 5 carbon atoms and radicals of the formula $(CH_2CH_2O)_nZ$ in which $n$ is an integer of at least 1 and Z is selected from the group consisting of hydrogen atoms and aliphatic hydrocarbon radicals of less than 5 carbon atoms.

5. An article of manufacture comprising the coated glass fibers of claim 4 bonded together with an organic resin.

6. A method comprising applying to glass an aqueous solution of a compound selected from the group consisting of epoxy compounds of the formulas

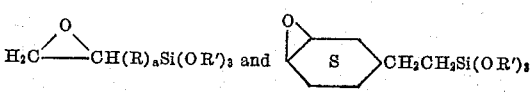

their epoxy-amine adducts of the formulas

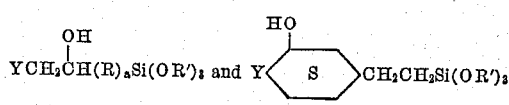

respectively, in which Y is a residue of an aliphatic hydrocarbon radical substituted water-miscible amine which residue is attached to the carbon through a carbon-nitrogen linkage, and water soluble hydrolyzates of said epoxy compounds and said epoxy-amine adducts, in all of which compounds R is a radical attached to silicon by a carbon-to-silicon bond and selected from the group consisting of divalent hydrocarbon radicals of less than 10 carbon atoms and divalent radicals of less than 10 carbon atoms which are composed of carbon, hydrogen, and oxygen atoms, the latter being in the form of ether linkages, $a$ has a value selected from the group consisting of 0 and 1 and R' is selected from the group consisting of aliphatic hydrocarbon radicals of less than 5 carbon atoms, carboxyacyl radicals of less than 5 carbon atoms and radicals of the formula $(—CH_2CH_2O)_nZ$ in which $n$ is an integer of at least 1 and Z is selected from the group consisting of hydrogen atoms and aliphatic hydrocarbon radicals of less than 5 carbon atoms, allowing the resulting coating to dry and bonding said coated glass with an organic resin.

References Cited in the file of this patent
UNITED STATES PATENTS

| | | |
|---|---|---|
| 2,649,396 | Witt et al. | Aug. 18, 1953 |
| 2,730,532 | Martin | Jan. 10, 1956 |
| 2,763,629 | Gottfurcht | Sept. 18, 1956 |
| 2,776,910 | Erickson et al. | Jan. 8, 1957 |